(12) United States Patent  
Koganti et al.

(10) Patent No.: US 10,171,303 B2  
(45) Date of Patent: Jan. 1, 2019

(54) IP-BASED INTERCONNECTION OF SWITCHES WITH A LOGICAL CHASSIS

(71) Applicant: AVAGO TECHNOLOGIES INTERNATIONAL SALES PTE. LIMITED, Singapore (SG)

(72) Inventors: Phanidhar Koganti, Fremont, CA (US); Suresh Vobbilisetty, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 14/867,865

(22) Filed: Sep. 28, 2015

(65) Prior Publication Data

US 2017/0078150 A1 Mar. 16, 2017

Related U.S. Application Data

(60) Provisional application No. 62/219,572, filed on Sep. 16, 2015.

(51) Int. Cl.
*H04L 12/24* (2006.01)
*H04L 12/46* (2006.01)
(Continued)

(52) U.S. Cl.
CPC .......... *H04L 41/0893* (2013.01); *H04L 12/28* (2013.01); *H04L 12/4633* (2013.01);
(Continued)

(58) Field of Classification Search
CPC . H04L 12/28; H04L 12/4633; H04L 41/0893; H04L 41/12; H04L 49/00; H04L 49/15; H04L 61/2007
See application file for complete search history.

(56) References Cited

U.S. PATENT DOCUMENTS

| 829,529 A | 8/1906 | Keathley |
| 5,390,173 A | 2/1995 | Spinney |

(Continued)

FOREIGN PATENT DOCUMENTS

| CN | 1735062 | 2/2006 |
| CN | 1777149 | 5/2006 |

(Continued)

OTHER PUBLICATIONS

"Network based IP VPN Architecture using Virtual Routers" Paul Knight et al.

(Continued)

*Primary Examiner* — Awet Haile
(74) *Attorney, Agent, or Firm* — Xsensus, LLP

(57) ABSTRACT

One embodiment of the present invention provides a switch. The switch includes a logical channel apparatus and a tunnel apparatus. The logical channel apparatus associates a logical channel identifier of a logical channel with the switch and assigns an Internet Protocol (IP) address as switch identifier of the switch. The logical channel includes a plurality of member switches and the switch is a member switch of the logical channel. The IP address uniquely identifies the switch in the logical channel. The tunnel apparatus establishes a tunnel with a remote switch in the logical channel. An inter-switch packet from the switch is encapsulated in a tunnel header associated with the tunnel.

13 Claims, 11 Drawing Sheets

(51) Int. Cl.
*H04L 29/12* (2006.01)
*H04L 12/933* (2013.01)
*H04L 12/28* (2006.01)
*H04L 12/931* (2013.01)

(52) U.S. Cl.
CPC .............. *H04L 41/12* (2013.01); *H04L 49/00* (2013.01); *H04L 49/15* (2013.01); *H04L 61/2007* (2013.01)

(56) References Cited

U.S. PATENT DOCUMENTS

| | | | |
|---|---|---|---|
| 5,802,278 | A | 9/1998 | Isfeld |
| 5,878,232 | A | 3/1999 | Marimuthu |
| 5,879,173 | A | 3/1999 | Poplawski |
| 5,959,968 | A | 9/1999 | Chin |
| 5,973,278 | A | 10/1999 | Wehrill, III |
| 5,983,278 | A | 11/1999 | Chong |
| 5,995,262 | A | 11/1999 | Hirota |
| 6,041,042 | A | 3/2000 | Bussiere |
| 6,085,238 | A | 7/2000 | Yuasa |
| 6,092,062 | A | 7/2000 | Lohman |
| 6,104,696 | A | 8/2000 | Kadambi |
| 6,122,639 | A | 9/2000 | Babu |
| 6,185,214 | B1 | 2/2001 | Schwartz |
| 6,185,241 | B1 | 2/2001 | Sun |
| 6,295,527 | B1 | 9/2001 | McCormack |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,553,029 | B1 | 4/2003 | Alexander |
| 6,571,355 | B1 | 5/2003 | Linnell |
| 6,583,902 | B1 | 6/2003 | Yuen |
| 6,633,761 | B1 | 10/2003 | Singhal |
| 6,636,963 | B1 | 10/2003 | Stein |
| 6,771,610 | B1 | 8/2004 | Seaman |
| 6,816,462 | B1 | 11/2004 | Booth, III |
| 6,870,840 | B1 | 3/2005 | Hill |
| 6,873,602 | B1 | 3/2005 | Ambe |
| 6,920,503 | B1 | 7/2005 | Nanji |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,062,177 | B1 | 6/2006 | Grivna |
| 7,097,308 | B2 | 8/2006 | Kim et al. |
| 7,173,934 | B2 | 2/2007 | Lapuh |
| 7,197,308 | B2 | 3/2007 | Singhal |
| 7,206,288 | B2 | 4/2007 | Cometto |
| 7,274,694 | B1 | 9/2007 | Cheng |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,768 | B1 | 7/2008 | Betker |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,599,901 | B2 | 10/2009 | Mital |
| 7,653,056 | B1 | 1/2010 | Dianes |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,801,021 | B1 | 9/2010 | Triantafillis |
| 7,808,992 | B2 | 10/2010 | Homchaudhuri |
| 7,836,332 | B2 | 11/2010 | Hara |
| 7,843,906 | B2 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,438 | B1 | 5/2011 | Miller |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,090,805 | B1 | 1/2012 | Chawla |
| 8,102,781 | B2 | 1/2012 | Smith |
| 8,102,791 | B2 | 1/2012 | Tang |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,095,774 | B1 | 6/2012 | Lambeth |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Wang |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | Jha |
| 8,369,347 | B2 | 2/2013 | Xiong |
| 8,392,496 | B2 | 3/2013 | Linden |
| 8,451,717 | B2 | 5/2013 | Srikrishnan |
| 8,462,774 | B2 | 6/2013 | Page |
| 8,465,774 | B2 | 6/2013 | Page |
| 8,467,375 | B2 | 6/2013 | Blair |
| 8,520,595 | B2 | 8/2013 | Yadav |
| 8,553,710 | B1 | 10/2013 | White |
| 8,595,479 | B2 | 11/2013 | Radhakrishnan |
| 8,599,850 | B2 | 12/2013 | Jha |
| 8,599,864 | B2 | 12/2013 | Chung |
| 8,615,008 | B2 | 12/2013 | Natarajan |
| 8,619,788 | B1 | 12/2013 | Sankaran |
| 8,625,616 | B2 | 1/2014 | Vobbilisetty |
| 8,705,526 | B1 | 4/2014 | Hasan |
| 8,706,905 | B1 | 4/2014 | McGlaughlin |
| 8,717,895 | B2 | 5/2014 | Koponen |
| 8,724,456 | B1 | 5/2014 | Hong |
| 8,792,501 | B1 | 7/2014 | Rustagi |
| 8,798,045 | B1 | 8/2014 | Aybay |
| 8,798,055 | B1 | 8/2014 | An |
| 8,804,732 | B1 | 8/2014 | Hepting |
| 8,804,736 | B1 | 8/2014 | Drake |
| 8,806,031 | B1 | 8/2014 | Kondur |
| 8,826,385 | B2 | 9/2014 | Congdon |
| 8,918,631 | B1 | 12/2014 | Kumar |

(56) References Cited

U.S. PATENT DOCUMENTS

| | | |
|---|---|---|
| 8,937,865 B1 | 1/2015 | Kumar |
| 8,948,181 B2 * | 2/2015 | Kapadia .................. H04L 45/74 370/392 |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |

(56) References Cited

U.S. PATENT DOCUMENTS

| | | |
|---|---|---|
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |

(56) References Cited

U.S. PATENT DOCUMENTS

| | | | |
|---|---|---|---|
| 2011/0064089 | A1 | 3/2011 | Hidaka |
| 2011/0072208 | A1 | 3/2011 | Gulati |
| 2011/0085557 | A1* | 4/2011 | Gnanasekaran ...... H04L 45/583 370/401 |
| 2011/0085560 | A1 | 4/2011 | Chawla |
| 2011/0085562 | A1 | 4/2011 | Bao |
| 2011/0085563 | A1 | 4/2011 | Kotha |
| 2011/0088011 | A1 | 4/2011 | Ouali |
| 2011/0110266 | A1 | 5/2011 | Li |
| 2011/0134802 | A1 | 6/2011 | Rajagopalan |
| 2011/0134803 | A1 | 6/2011 | Dalvi |
| 2011/0134924 | A1 | 6/2011 | Hewson |
| 2011/0134925 | A1 | 6/2011 | Safrai |
| 2011/0142053 | A1 | 6/2011 | VanDerMerwe |
| 2011/0142062 | A1 | 6/2011 | Wang |
| 2011/0149526 | A1 | 6/2011 | Turner |
| 2011/0158113 | A1 | 6/2011 | Nanda |
| 2011/0161494 | A1 | 6/2011 | McDysan |
| 2011/0161695 | A1 | 6/2011 | Okita |
| 2011/0176412 | A1 | 7/2011 | Stine |
| 2011/0188373 | A1 | 8/2011 | Saito |
| 2011/0194403 | A1 | 8/2011 | Sajassi |
| 2011/0194563 | A1 | 8/2011 | Shen |
| 2011/0225540 | A1 | 9/2011 | d'Entremont |
| 2011/0228767 | A1 | 9/2011 | Singla |
| 2011/0228780 | A1 | 9/2011 | Ashwood-Smith |
| 2011/0231570 | A1 | 9/2011 | Altekar |
| 2011/0231574 | A1 | 9/2011 | Saunderson |
| 2011/0235523 | A1 | 9/2011 | Jha |
| 2011/0243133 | A9 | 10/2011 | Villait |
| 2011/0243136 | A1 | 10/2011 | Raman |
| 2011/0246669 | A1 | 10/2011 | Kanada |
| 2011/0255538 | A1 | 10/2011 | Srinivasan |
| 2011/0255540 | A1* | 10/2011 | Mizrahi ................. H04L 45/00 370/392 |
| 2011/0261828 | A1 | 10/2011 | Smith |
| 2011/0268118 | A1 | 11/2011 | Schlansker |
| 2011/0268120 | A1 | 11/2011 | Vobbilisetty |
| 2011/0268125 | A1 | 11/2011 | Vobbilisetty |
| 2011/0273988 | A1 | 11/2011 | Tourrilhes |
| 2011/0273990 | A1 | 11/2011 | Rajagopalan |
| 2011/0274114 | A1 | 11/2011 | Dhar |
| 2011/0280572 | A1 | 11/2011 | Vobbilisetty |
| 2011/0286357 | A1 | 11/2011 | Haris |
| 2011/0286457 | A1 | 11/2011 | Ee |
| 2011/0286462 | A1 | 11/2011 | Kompella |
| 2011/0055274 | A1 | 12/2011 | Hegge |
| 2011/0292947 | A1 | 12/2011 | Vobbilisetty |
| 2011/0296052 | A1 | 12/2011 | Guo |
| 2011/0299391 | A1 | 12/2011 | Vobbilisetty |
| 2011/0299413 | A1 | 12/2011 | Chatwani |
| 2011/0299414 | A1 | 12/2011 | Yu |
| 2011/0299527 | A1 | 12/2011 | Yu |
| 2011/0299528 | A1 | 12/2011 | Yu |
| 2011/0299531 | A1 | 12/2011 | Yu |
| 2011/0299532 | A1 | 12/2011 | Yu |
| 2011/0299533 | A1 | 12/2011 | Yu |
| 2011/0299534 | A1 | 12/2011 | Koganti |
| 2011/0299535 | A1 | 12/2011 | Vobbilisetty |
| 2011/0299536 | A1 | 12/2011 | Cheng |
| 2011/0317559 | A1 | 12/2011 | Kern |
| 2011/0317703 | A1 | 12/2011 | Dunbar et al. |
| 2012/0011240 | A1 | 1/2012 | Hara |
| 2012/0014261 | A1 | 1/2012 | Salam |
| 2012/0014387 | A1 | 1/2012 | Dunbar |
| 2012/0020220 | A1 | 1/2012 | Sugita |
| 2012/0027017 | A1 | 2/2012 | Rai |
| 2012/0033663 | A1 | 2/2012 | Guichard |
| 2012/0033665 | A1 | 2/2012 | Jacob |
| 2012/0033668 | A1 | 2/2012 | Humphries |
| 2012/0033669 | A1 | 2/2012 | Mohandas |
| 2012/0033672 | A1 | 2/2012 | Page |
| 2012/0039163 | A1 | 2/2012 | Nakajima |
| 2012/0042095 | A1 | 2/2012 | Kotha |
| 2012/0063363 | A1 | 3/2012 | Li |
| 2012/0075991 | A1 | 3/2012 | Sugita |
| 2012/0099567 | A1 | 4/2012 | Hart |
| 2012/0099602 | A1 | 4/2012 | Nagapudi |
| 2012/0099863 | A1 | 4/2012 | Xu |
| 2012/0102160 | A1 | 4/2012 | Breh |
| 2012/0106339 | A1 | 5/2012 | Mishra |
| 2012/0117438 | A1 | 5/2012 | Shaffer |
| 2012/0131097 | A1 | 5/2012 | Baykal |
| 2012/0131289 | A1 | 5/2012 | Taguchi |
| 2012/0134266 | A1 | 5/2012 | Roitshtein |
| 2012/0136999 | A1 | 5/2012 | Roitshtein |
| 2012/0147740 | A1 | 6/2012 | Nakash |
| 2012/0158997 | A1 | 6/2012 | Hsu |
| 2012/0163164 | A1 | 6/2012 | Terry |
| 2012/0170491 | A1 | 7/2012 | Kern |
| 2012/0177039 | A1 | 7/2012 | Berman |
| 2012/0210416 | A1 | 8/2012 | Mihelich |
| 2012/0221636 | A1 | 8/2012 | Surtani |
| 2012/0230225 | A1 | 9/2012 | Matthews |
| 2012/0239918 | A1 | 9/2012 | Huang |
| 2012/0243359 | A1 | 9/2012 | Keesara |
| 2012/0243539 | A1 | 9/2012 | Keesara |
| 2012/0250502 | A1 | 10/2012 | Brolin |
| 2012/0260079 | A1 | 10/2012 | Mruthyunjaya |
| 2012/0275297 | A1 | 11/2012 | Subramanian |
| 2012/0275347 | A1 | 11/2012 | Banerjee |
| 2012/0278804 | A1 | 11/2012 | Narayanasamy |
| 2012/0281700 | A1 | 11/2012 | Koganti |
| 2012/0287785 | A1 | 11/2012 | Kamble |
| 2012/0294192 | A1 | 11/2012 | Masood |
| 2012/0294194 | A1 | 11/2012 | Balasubramanian |
| 2012/0230800 | A1 | 12/2012 | Kamble |
| 2012/0320800 | A1 | 12/2012 | Kamble |
| 2012/0320926 | A1 | 12/2012 | Kamath et al. |
| 2012/0327766 | A1 | 12/2012 | Tsai et al. |
| 2012/0327937 | A1 | 12/2012 | Melman et al. |
| 2013/0003535 | A1 | 1/2013 | Sarwar |
| 2013/0003549 | A1 | 1/2013 | Matthews |
| 2013/0003608 | A1 | 1/2013 | Lei |
| 2013/0003737 | A1 | 1/2013 | Sinicrope |
| 2013/0003738 | A1 | 1/2013 | Koganti |
| 2013/0003747 | A1 | 1/2013 | Raman |
| 2013/0016606 | A1 | 1/2013 | Cirkovic |
| 2013/0028072 | A1 | 1/2013 | Addanki |
| 2013/0034015 | A1 | 2/2013 | Jaiswal |
| 2013/0034021 | A1 | 2/2013 | Jaiswal |
| 2013/0034094 | A1 | 2/2013 | Cardona |
| 2013/0044629 | A1 | 2/2013 | Biswas |
| 2013/0058354 | A1 | 3/2013 | Casado |
| 2013/0066947 | A1 | 3/2013 | Ahmad |
| 2013/0067466 | A1 | 3/2013 | Combs |
| 2013/0070762 | A1 | 3/2013 | Adams |
| 2013/0083693 | A1 | 4/2013 | Himura |
| 2013/0097345 | A1 | 4/2013 | Munoz |
| 2013/0114595 | A1 | 5/2013 | Mack-Crane et al. |
| 2013/0121142 | A1 | 5/2013 | Bai |
| 2013/0124707 | A1 | 5/2013 | Ananthapadmanabha |
| 2013/0124750 | A1 | 5/2013 | Anumala |
| 2013/0127848 | A1 | 5/2013 | Joshi |
| 2013/0132296 | A1 | 5/2013 | Manfred |
| 2013/0135811 | A1 | 5/2013 | Dunwoody |
| 2013/0136123 | A1 | 5/2013 | Ge |
| 2013/0145008 | A1 | 6/2013 | Kannan |
| 2013/0148546 | A1 | 6/2013 | Eisenhauer |
| 2013/0148663 | A1* | 6/2013 | Xiong ................... H04L 45/745 370/392 |
| 2013/0156425 | A1 | 6/2013 | Kirkpatrick |
| 2013/0163591 | A1* | 6/2013 | Shukla ................. H04L 49/357 370/355 |
| 2013/0194914 | A1 | 8/2013 | Agarwal |
| 2013/0201992 | A1* | 8/2013 | Masaki ................. H04L 45/245 370/400 |
| 2013/0215754 | A1 | 8/2013 | Tripathi |
| 2013/0219473 | A1 | 8/2013 | Schaefer |
| 2013/0223221 | A1 | 8/2013 | Xu |
| 2013/0223438 | A1 | 8/2013 | Tripathi |
| 2013/0223449 | A1 | 8/2013 | Koganti |
| 2013/0238802 | A1 | 9/2013 | Sarikaya |
| 2013/0250947 | A1 | 9/2013 | Zheng |

(56) References Cited

U.S. PATENT DOCUMENTS

| | | |
|---|---|---|
| 2013/0250951 A1* | 9/2013 | Koganti .............. H04L 49/356 370/390 |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1* | 12/2013 | Nakil ................ H04L 41/0668 370/255 |
| 2013/0332660 A1 | 12/2013 | Talagala |
| 2013/0336104 A1 | 12/2013 | Talla |
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1* | 7/2014 | Okita .................. H04L 45/245 709/239 |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Moopath |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1* | 4/2015 | Kompella ............ H04L 45/50 370/254 |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Soderlund et al. |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.

(56) References Cited

OTHER PUBLICATIONS

Office Action for U.S. Appl. No. 13/288,822, dated May 26, 2017.
Office Action for U.S. Appl. No. 14/329,447, dated Jun. 8, 2017.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Office Action dated Jun. 18, 215, U.S. Appl. No. 13/098,490, filed May 2, 2011.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.

(56) References Cited

OTHER PUBLICATIONS

Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.

(56) References Cited

OTHER PUBLICATIONS

Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.

(56) References Cited

OTHER PUBLICATIONS

Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.

\* cited by examiner

IP-BASED INTERCONNECTION OF SWITCHES WITH A LOGICAL CHASSIS

RELATED APPLICATION

This application claims the benefit of U.S. Provisional Application No. 62/219,572, titled "IP-BASED INTERCONNECTION OF SWITCHES WITH A LOGICAL CHASSIS," by inventors Phanidhar Koganti and Suresh Vobbilisetty, filed 16 Sep. 2015, the disclosure of which is incorporated by reference herein.

BACKGROUND

Field

This disclosure relates to communication networks. More specifically, the present disclosure relates to a method for a constructing a scalable switching system.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to bandwidth considerations.

A flexible way to improve the scalability of a switch system is to build an interconnection of switches that share a single logical chassis (also referred to as "fabric switch"). A fabric switch is a collection of individual member switches. These member switches form a network of interconnected switches that can have an arbitrary number of ports and an arbitrary topology. As demands grow, customers can adopt a "pay as you grow" approach to scale up the capacity of the fabric switch.

While a fabric switch brings desirable features, some issues remain unsolved in efficient formation and data transportation of a scalable fabric switch.

SUMMARY

One embodiment of the present invention provides a switch. The switch includes a logical chassis apparatus and a tunnel apparatus. The logical chassis apparatus associates a logical chassis identifier of a logical chassis with the switch and assigns an Internet Protocol (IP) address as switch identifier of the switch. The logical chassis includes a plurality of member switches and the switch is a member switch of the logical chassis. The IP address uniquely identifies the switch in the logical chassis. The tunnel apparatus establishes a tunnel with a remote switch in the logical chassis. An inter-switch packet from the switch is encapsulated in a tunnel header associated with the tunnel.

In a variation on this embodiment, the logical chassis apparatus maintains a mapped identifier assigned to the switch. The mapped identifier is an index for the switch in the logical chassis.

In a further variation, a port of the switch is identified by a port identifier uniquely identifying the port in the logical chassis. This port identifier includes the mapped identifier.

In a variation on this embodiment, the logical chassis apparatus determines adjacency in the logical chassis by running a routing protocol.

In a variation on this embodiment, the logical chassis apparatus operates as the logical chassis as a single manageable entity for provisioning, control, or both.

In a further variation, the logical chassis apparatus manages the logical chassis based on one or more of: a command line interface (CLI), a Network Configuration Protocol (NETCONF), and RESTCONF.

In a variation on this embodiment, the switch is in a logical unit, which is a building unit of a logical chassis.

In a further variation, the logical unit includes a second switch, and the switch and the second switch operate as tunnel end points for the tunnel.

In a variation on this embodiment, the switch also includes a logical tunnel end point apparatus, which operates the logical chassis as an end point for an external tunnel. The other end point of the external tunnel is outside of the logical chassis.

In a variation on this embodiment, the switch also includes a link aggregation apparatus, which identifies a plurality of links coupled to a same neighbor switch and operates the identified links as a link aggregation group. The links in the link aggregation group operate as a single logical link.

In a variation on this embodiment, the switch is in a software defined network and receives configuration information in an instruction from a controller of the software defined network.

In a variation on this embodiment, the logical chassis apparatus establishes a point-to-point connection with a neighbor switch using an unnumbered interface based on the IP address.

In a variation on this embodiment, the logical chassis apparatus discovers a neighbor switch based on a link discovery protocol.

BRIEF DESCRIPTION OF THE FIGURES

In the figures, like reference numerals refer to the same figure elements.

DETAILED DESCRIPTION

Figure 1A:
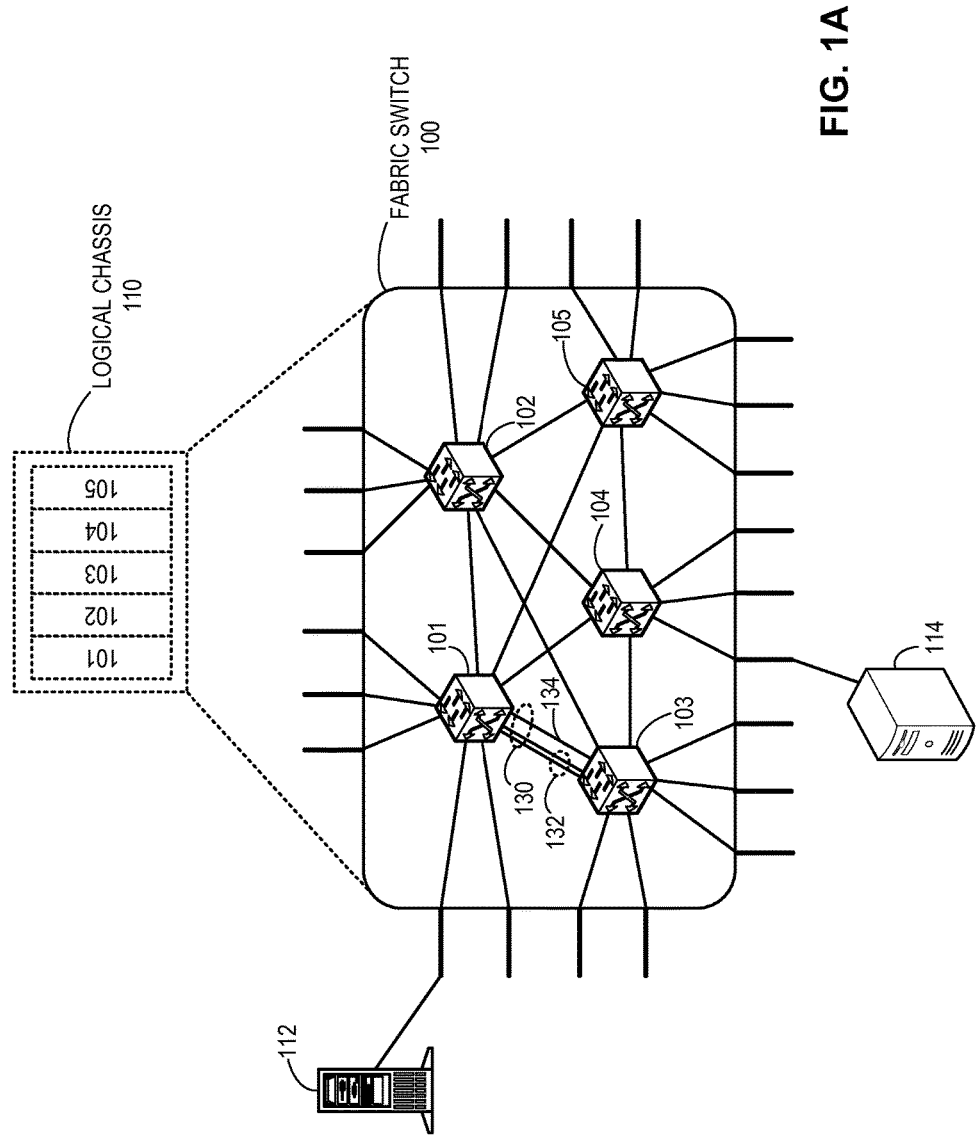
FIG. 1A illustrates an exemplary Internet-Protocol-based (IP-based) fabric switch, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of building a versatile, cost-effective, and scalable switching system is solved by forming a topology agnostic fabric switch based on an internal (or underlay) layer-3 protocol. This internal layer-3 protocol operates within the fabric switch and may not advertise routes within the fabric switch outside. A respective switch of the fabric switch can be referred to as a member switch. One can form a large-scale switch using a number of smaller physical switches. In some embodiments, this fabric switch can appear as a single logical entity in the provisioning and control plane. This allows a user to provide configuration information to a member switch, which, in turn, propagates the configuration information to other member switches. In this way, a respective member switch can locally apply the configuration information.

In some embodiments, the control plane running on a respective member switch allows any number of switches to be connected in an arbitrary topology without requiring tedious manual configuration of the ports and links. This feature makes it possible to use many smaller, inexpensive switches to construct a large network, which can operate as a single switch in the data plane as well. When a member switch of such a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which form a single, scalable network of switches. The member switches of the fabric switch can operate as individual switches. The member switches of the fabric switch can also operate as a single switch in the provision and control plane, the data plane, or both. "Fabric switch" should not be interpreted as limiting embodiments of the present invention to a plurality of switches operating as a single, logical switch.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary IP-based fabric switch, in accordance with an embodiment of the present invention. As illustrated in FIG. 1A, a fabric switch 100 includes member switches 101, 102, 103, 104, and 105. Fabric switch 100 can be based on IP and a respective member switch, such as switch 105, can be an IP-capable switch, which calculates and maintains a local IP routing table (e.g., a routing information base or RIB), and is capable of forwarding packets based on its IP addresses. The routing table specifies routes within fabric switch 100. To populate the IP routing table, a respective member switch uses a routing protocol (e.g., OSPF-based routing protocol). In some embodiments, one or more switches in fabric switch 100 can be virtual switches (e.g., a software switch running on a computing device). Switches 101 and 104 are coupled to end devices 112 and 114, respectively.

Member switches in fabric switch 100 use edge ports to communicate with end devices and inter-switch ports to communicate with other member switches. For example, switch 101 is coupled to end device 101 via an edge port and to switches 102, 103, 104, and 105 via inter-switch ports. Communication between member switches via inter-switch ports can be based on IP, and communication between an end device and a member switch via an edge port can be based on Ethernet. For example, switch 104 receives an Ethernet frame from end device 114 via an edge port. Switch 104 then encapsulates the Ethernet frame in an IP header (e.g., a layer-3 tunnel header) and forwards the encapsulated packet to another member switch. It should be noted that the encapsulated packet can have an external Ethernet header for layer-2 forwarding.

A respective switch in fabric switch 100 is assigned a switch identifier, such as an IP address (e.g., an IP v4 or IP v6 address). A user (e.g., a network administrator) can assign the switch identifier to a respective member switch. For example, end device 112 can be an administrator workstation and the user can assign a switch identifier of a respective member switch from end device 112. A switch can also be dynamically assigned to a switch (e.g., using a Dynamic Host Configuration Protocol (DHCP) server). In some embodiments, from provisioning perspective (e.g., assigning an IP address), end device 112 views fabric switch as a single logical entity, such as a logical chassis 110. A respective member switch can appear as an element in logical chassis 110. As a result, the user can configure fabric switch 100 from a single location (e.g., end device 112), and global configurations (i.e., the configurations applicable to a respective switch) can be automatically applied to a respective member switch. End device 112 can manage logical chassis 110 as a single manageable entity. In some embodiments, end device 112 can use command line interface (CLI) of a switch or a management protocol to manage logical chassis 110. Examples of a management protocol include, but are not limited to, Network Configuration Protocol (NETCONF) and RESTCONF.

Furthermore, a respective member switch is assigned a mapped identifier, which can be a switch index within fabric switch 100. This mapped identifier can also be locally generated in a switch based on the local switch identifier. The mapped identifier can operate as a "shortened" identifier for a switch. In the example in FIG. 1A, fabric switch 100 includes five member switches. A switch identifier for a respective switch in fabric switch 100 can be an IP address, which is 32 bits long for IP v4 or 128 bits long for IP v6. However, a number represented by three bits (e.g., integers 0-4) can identify the member switches in fabric switch 100. Hence, a three-bit long mapped identifier can be used to represent the member switches of fabric switch 100. In some embodiments, the number of bits dedicated for a mapped identifier in fabric switch 100 is determined based on the maximum number of member switches supported by fabric switch 100. For example, if fabric switch 100 supports a maximum 64 member switches, mapped identifier for fabric switch 100 should be at least six bits long.

In some embodiments, a port in fabric switch 100 is assigned a port identifier, which uniquely identifies the port in fabric switch 100. A port identifier in fabric switch 100 can be in a "mapped identifier/chassis number (e.g., line card number)/port number" format. If the mapped identifier of switch 101 is "X," and switch 101 has at least three chassis, one of which includes at least 16 ports, a port identifier of switch 101 can be "X/2/15." This identifier represents the sixteenth port of the third chassis of switch 101. Similarly, if the mapped identifier of switch 102 is "Y," and switch 102 also has at least three chassis, each of which includes at least 16 ports, a port identifier of switch 102 can be "Y/2/15." In this way, the mapped identifier in a port identifier distinguishes two ports having the same chassis and port number in fabric switch 100. If a switch is a "pizza box" switch with a single chassis, the chassis number in a port identifier can be "0."

During operation, a respective member switch of fabric switch 100 uses a link discovery protocol via its inter-switch links to discover a neighbor switch. Examples of a link discovery protocol include, but are not limited to, Link Layer Discovery Protocol (LLDP) and Brocade Link Discovery Protocol (BLDP). In some embodiments, an inter-switch link can be modeled as a point-to-point unnumbered interface to avoid IP address and/or mask configuration for a respective inter-switch link. For example, when respective IP addresses are assigned to switches 103 and 104 as switch identifiers, the inter-switch communication between switches 103 and 104 can be established as a point-to-point communication channel between the corresponding interfaces using the IP addresses. This allows auto discovery of neighbors in fabric switch 100 without configuring an individual IP address for a respective interface.

In some embodiments, fabric switch 100 is assigned a fabric identifier, which uniquely identifies fabric switch 100. The fabric identifier is assigned to a respective switch of fabric switch 100 (e.g., the user can configure from end device 112). Upon discovering each other, switches 101 and 103 determine that they have the same fabric identifier of fabric switch 100 and belong to the same fabric switch. This allows a member switch of fabric switch 100 to automatically detect other member switches and form fabric switch 100.

In some embodiments, inter-switch links in fabric switch 100 supports automatic formation of link aggregations. Suppose that three links couple switches 101 and 103. As a result, switch 101 discovers switch 103 via all three links, and vice versa. For example, switch 101 can receive a link discovery message (e.g., LLDP Data Unit (LLDPDU)) comprising the same switch identifier of switch 103 via the three links. Switch 101 then determines that switch 101 is coupled to switch 103 via those three links. Similarly, switch 103 also determines that switch 103 is coupled to switch 101 via three links. Switch 101 and 103 then automatically aggregate the links between them to form an inter-switch link aggregation group 130.

If a link in link aggregation group 130 becomes unavailable, other links can continue to operate. However, if the number of links becomes one, virtual link aggregation group 130 can become an individual link. If link aggregation group 130 becomes unavailable (e.g., due to multiple link failures or a node failure), switches 101 and 103 detect the unavailability, and generate and send a notification message notifying other member switches regarding the unavailability (e.g., in the payload of a notification message). Similarly, if the link between switches 104 and 105 becomes unavailable, switches 104 and 105 detect the unavailability, and generate and send a notification message. Upon receiving the notification message, other member switches run the routing protocol based on the updated adjacency to determine the updated paths.

In link aggregation group 130, the links can be coupled to one or more network interface cards (NICs). For example, if a set of links are coupled to a NIC in switch 101 are also coupled to a NIC in switch 103, the set of links form a link trunk 132. Link trunk 132 and individual non-trunk link 134 between switches 101 and 103 then form link aggregation group 130. It should be noted that a link aggregation group can include a combination of link trunks and individual links.

Upon forming the link aggregation groups for inter-switch links, a respective member switch in fabric switch 100 runs a routing protocol to discover adjacency in fabric switch 100. Examples of a routing protocol include, but are not limited to, Open Shortest Path First (OSPF) based routing protocols, distance vector based routing protocols, and a combination thereof. This routing protocol discovers one or more paths between the member switches. For example, switch 103 discovers that switch 105 is reachable via a path comprising switch 104, and can assign switch 104 as the next-hop switch for switch 105. If a link aggregation group exists between a member switch pair, the adjacency can be formed over that link aggregation group. For example, adjacency between switches 101 and 103 can be formed over link aggregation group 130.

In some embodiments, a respective switch of fabric switch 100 supports priority-based flow control (PFC). In this way, during packet forwarding within fabric switch 100, a member switch can provide a uniform quality of service (QoS) for the outer and inner layer-2 headers. During operation, switch 104 receives an Ethernet frame from end device 114. Switch 104 identifies the priority value associated with PFC in the Ethernet header and encapsulates the frame in an IP header and an outer Ethernet header. Switch 104 maps the identified priority value in the outer Ethernet header (e.g., a one-to-one mapping) and forwards the encapsulated packet based on its destination. Upon receiving the packet, any other member switch applies priority-based flow control based on the priority value in the outer Ethernet header to the packet.

In some embodiments, a member switch can share information with another member switch in fabric switch 100 based on a name service. Upon learning a MAC address, a member switch includes the learned MAC address in a payload of a name service notification message and sends the message a respective other switches of fabric switch 100 via the name service. In this way, a respective member switch is aware of the locations of the end devices coupled with fabric switch 100. In some embodiments, the payload format of the notification message is the same regardless of the protocol based on which the name service. This allows the name service to be backward compatible. The name service can be implemented based on a scale protocol, such as ZeroMQ and NanoMsg.

Figure 1B:
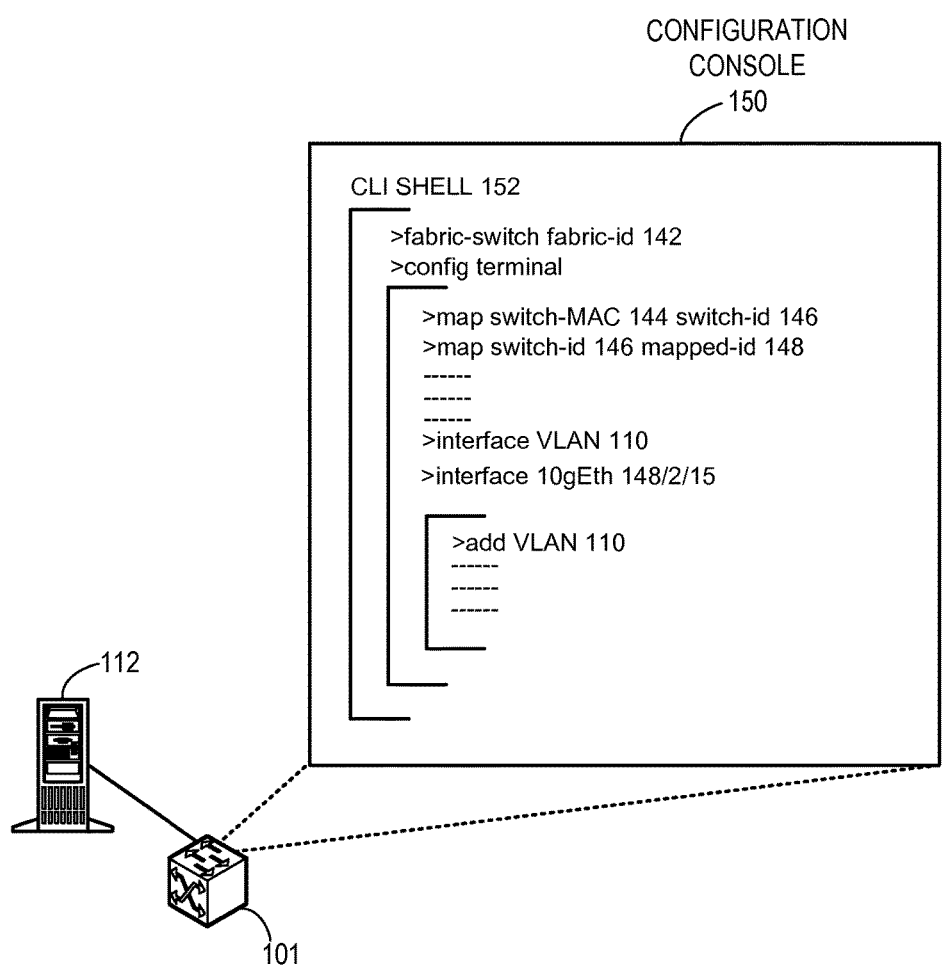
FIG. 1B illustrates an exemplary console for configuring an IP-based fabric switch, in accordance with an embodiment of the present invention.

FIG. 1B illustrates an exemplary console for configuring an IP-based fabric switch, in accordance with an embodiment of the present invention. In this example, switch 101 has a console 150. Upon accessing (e.g., from end device 112), switch 101 presents console 150 to the user. In some embodiments, when the user accesses switch 101, console 150 provides a command line interface shell 152 to the user. The user can type commands to shell 152. Shell 152 can be the initial screen which appears when the user accesses switch 101. Suppose that fabric switch 100 has a fabric identifier 142, which identifies fabric switch 100 and is associated with a respective switch of fabric switch 100. Since fabric switch 100 can operate as a single logical chassis for the provision and control plane, the user can provide a command to shell 152 to gain access to fabric switch 100 as a logical chassis (e.g., "fabric-switch fabric-id 142"). This allows the user to provision fabric switch 100 as logical chassis 110.

The user then provides another command (e.g., "config terminal") to shell 152 to gain access to a configuration terminal for fabric switch 100 in shell 152. The user can use this configuration terminal to provide global configuration associated with fabric switch 100 and local configuration associated with any member switch in fabric switch 100. For example, if switch 101 has a switch MAC address 144, the user can issue a command to the terminal to map MAC address 144 to a switch identifier 146 (e.g., a switch IP address). Similarly, the user can issue another command to the terminal to map switch identifier 146 to a mapped identifier 148. In some embodiments, switch 101 can generate mapped identifier 148 from switch identifier 146 (e.g., without a user configuration). Mapped identifier 148 can also be pre-assigned to switch 101.

The user can issue a command to the terminal to create a VLAN 110. This VLAN 110 is created across fabric switch 100, and hence, is part of the global configuration. On the other hand, user can also issue a command to configure a specific port of a specific switch in fabric switch 100. This port configuration is a local configuration for that switch. In some embodiments, a port is identified by a port identifier, which can be in a "mapped identifier/chassis number (e.g., line card number)/port number" format. For example, the user can configure a 10 Gigabit Ethernet port identified by port identifier "148/2/15." Since switch 101 is associated with mapped identifier 148, the port identifier indicates that the port is port number 16 in line card number 3 of switch 101. The user can add VLAN 110 to that specific port. This VLAN configuration of the port is a local configuration of switch 101.

Figure 1C:
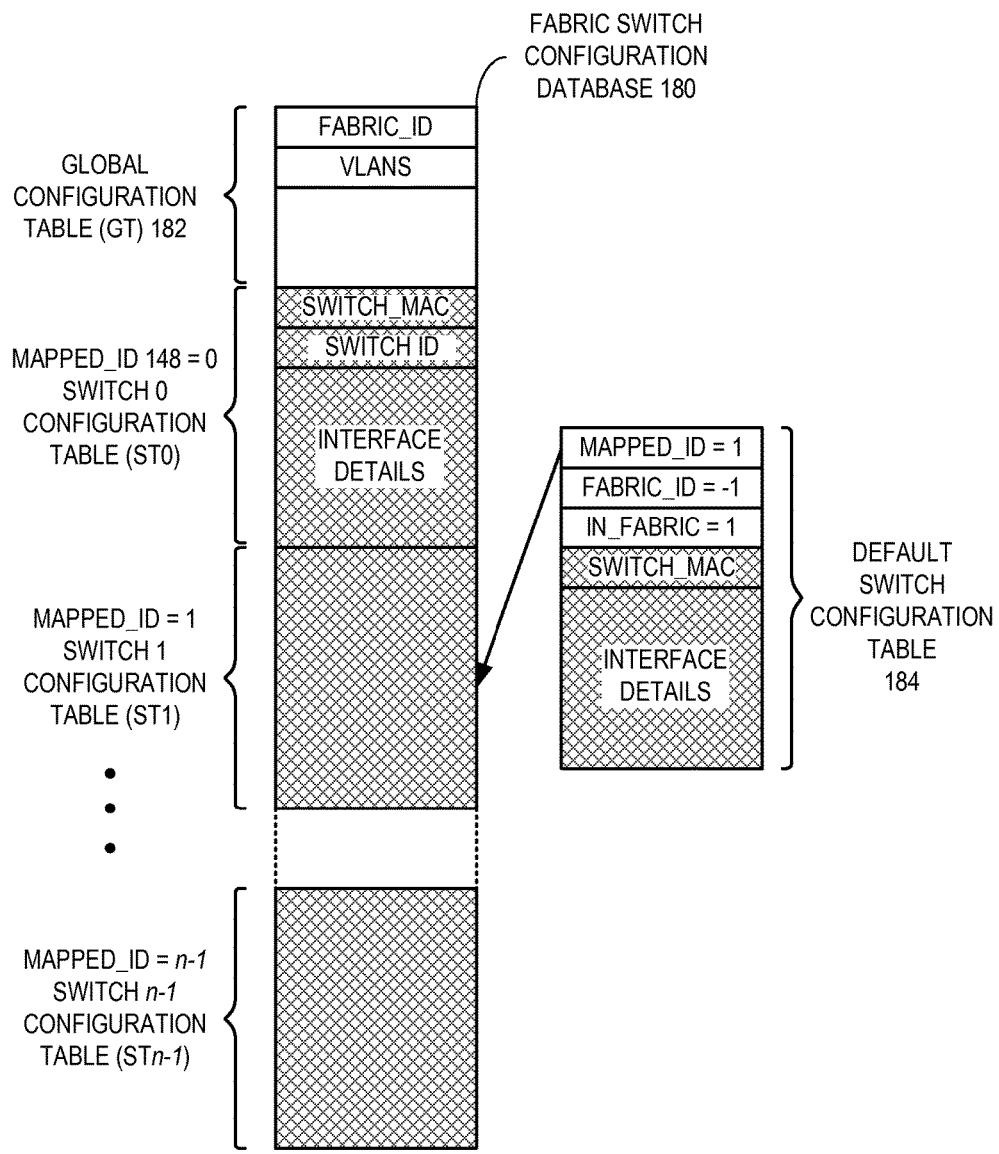
FIG. 1C illustrates an exemplary configuration database for an IP-based fabric switch, in accordance with an embodiment of the present invention.

FIG. 1C illustrates an exemplary configuration database for an IP-based fabric switch, in accordance with an embodiment of the present invention. As illustrated in FIG. 1C, a member switch of fabric switch 100 typically maintains two configuration tables that describe its instance: a fabric switch configuration database 180, and a default switch configuration table 184. Configuration database 180 describes the fabric switch configuration when a switch is part of fabric switch 100. Default switch configuration table 184 describes the switch's default configuration. Configuration database 180 includes a global configuration table (GT) 182, which includes a fabric switch identifier, such as fabric identifier 142 for fabric switch 100 (denoted as FABRIC_ID), and a VLAN list in fabric switch 100. Also included in configuration database 180 are a number of switch (or local) configuration tables (STs or LTs), such as ST0, ST1, and STn. Each ST includes the corresponding member switch's MAC address and the switch identifier, as well as the switch's interface details.

In some embodiments, when a switch joins fabric switch 100 for the first time, fabric switch 100 assigns a mapped identifier to the switch. For example, fabric switch 100 assigns a value of "0" to mapped identifier 148 of switch 101 and stores in corresponding ST0. This mapped identifier persists with switch 101, even if switch 101 leaves fabric switch 100. When switch 101 joins fabric switch 100 again at a later time, the same mapped identifier "0" is used by fabric switch 100 to retrieve previous configuration information for switch 101. This feature can reduce the amount of configuration overhead in fabric switch 100. Also, the persistent mapped identifier allows fabric switch 100 to "recognize" a previously configured member switch 101 when it re-joins fabric switch 100, since a dynamically assigned switch identifier can change each time switch 101 joins and is configured by fabric switch 100.

Default switch configuration table 184 has an entry for the mapped identifier that points to the corresponding ST in configuration database 180. Note that configuration database 180 is replicated and distributed to all switches in fabric switch 100. Default switch configuration table 184 is local to a particular member switch.

The "IN_FABRIC" value in default switch configuration table 184 indicates whether the member switch is part of a fabric switch. A switch is considered to be "in a fabric switch" when it is assigned one of the switch identifiers by a fabric switch. When a switch is first connected to fabric switch 100, fabric switch formation process allocates a new switch identifier to the joining switch. In one embodiment, only the switches directly connected to the new switch participate in the join operation.

Note that in the case where the global configuration database of a joining switch is current and in sync with the global configuration database of fabric switch 100 based on a comparison of the transaction identifiers of the two databases (e.g., when a member switch is temporarily disconnected from fabric switch 100 and re-connected shortly afterward), a trivial merge is performed. That is, the joining switch can be connected to fabric switch 100, and no change or update to the global configuration database is required.

Figure 1D:
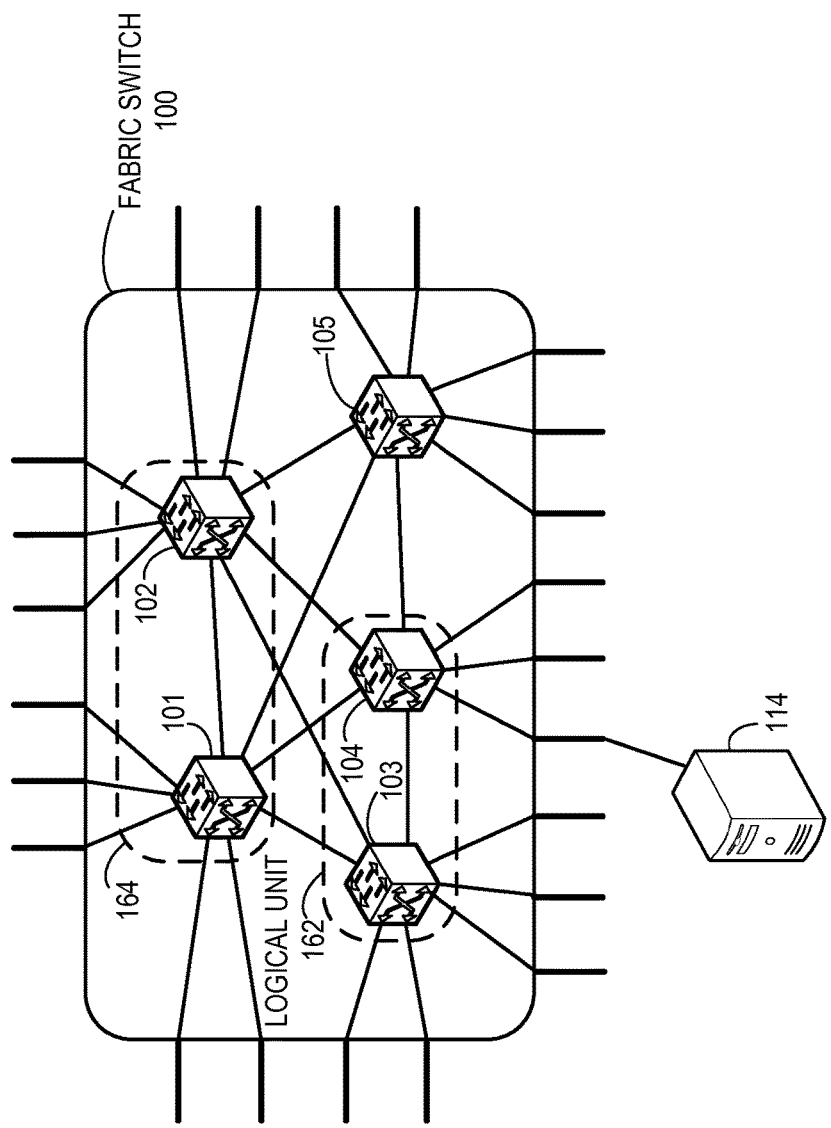
FIG. 1D illustrates exemplary logical units in an IP-based fabric switch, in accordance with an embodiment of the present invention.

FIG. 1D illustrates exemplary logical units in an IP-based fabric switch, in accordance with an embodiment of the present invention. The logical building block of fabric switch 100 can be a single switch or a group of switches. The selection of a building block can be based on the customer requiring a switch-level high availability. To facilitate high availability among member switches of fabric switch 100, a plurality of switches can form a logical unit, and a logical unit can operate as a single logical member of fabric switch. In some embodiments, switches 103 and 104 can form a logical unit 162, and switches 101 and 102 can form another logical unit 164. A fabric switch can include a combination of logical units and standalone member switches. In the example in FIG. 1D, fabric switch 100 includes logical units 162 and 164, and standalone member switch 105. In some embodiments, standalone switch 105 can operate as a logical unit.

A respective switch can be assigned a logical unit identifier, which identifies to which logical unit the switch belongs. For example, switches 103 and 104 can have the same logical unit identifier, which identifies logical unit 162. During operation, a switch discovers other switches with the same fabric identifier and logical identifier, and automatically forms a logical unit with the discovered switches. The switches in a logical unit can operate in an active-standby mode (one switch remains active and others are in standby mode), or in an active-active mode (a respective switch receives and forwards traffic).

Tunnel-Based Fabric Encapsulation

Figure 2A:
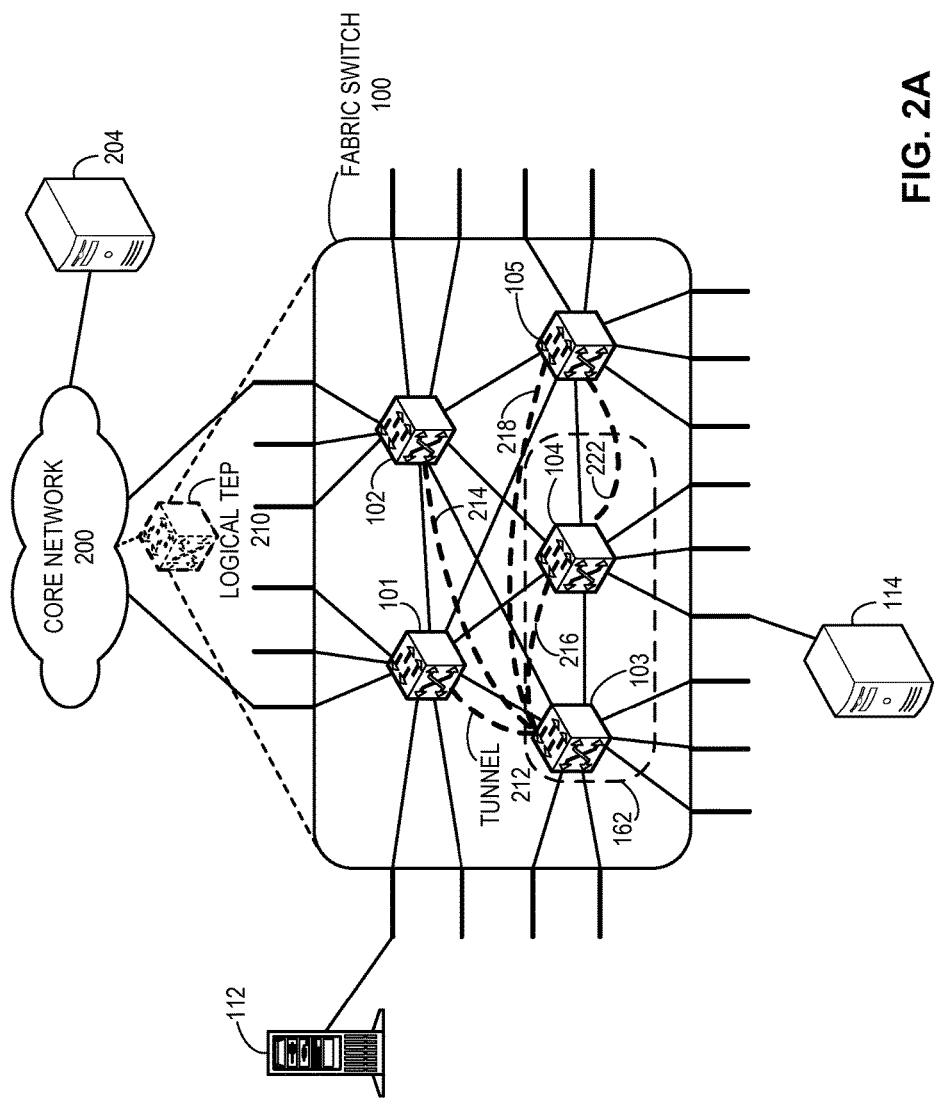
FIG. 2A illustrates exemplary inter-switch tunnels in an IP-based fabric switch, in accordance with an embodiment of the present invention.

In some embodiments, a respective member switch forwards traffic in fabric switch 100 based on an encapsulation header (e.g., a tunnel encapsulation header). FIG. 2A illustrates exemplary inter-switch tunnels in an IP-based fabric switch, in accordance with an embodiment of the present invention. Suppose that fabric switch 100 is coupled with a layer-3 core network 200 via switches 101 and 102. For forwarding traffic within fabric switch 100, all member switches do not need to participate in the routing protocol of network 200 (e.g., the overlay routing protocol). Switches 101 and 102 can participate in the routing protocol of network 200 and operate as gateways. It should be noted that a respective member switch, including switches 101 and 102, participate in the internal (or underlay) routing protocol of fabric switch 100 for IP-based forwarding within fabric switch 100. The internal routing protocol interfaces with network 200. The internal routing protocol advertises the subnets associated with the overlay network as connected routes to network 200.

In some embodiments, inter-switch packet forwarding in fabric switch 100 is based on tunnel encapsulation. Examples of a tunnel encapsulation protocol include, but are not limited to, Virtual Extensible Local Area Network (VXLAN), Generic Routing Encapsulation (GRE), and its variations, such as Network Virtualization using GRE (NVGRE) and openvSwitch GRE. A respective switch of fabric switch 100 establishes a tunnel with a respective other member switch (e.g., a full mesh of tunnels). For example, switch 103 establishes tunnels 212, 214, 216, and 218 with switches 101, 102, 104, and 105 respectively. If a tunnel spans an inter-switch link aggregation, that tunnel can use all links in the link aggregation to forward traffic. For example, tunnel 212 can use all links in link aggregation 130.

It should be noted that, even though inter-switch packet forwarding in fabric switch 100 is based on a tunnel encapsulation header, fabric switch 100 represents itself as a single logical tunnel end point (TEP) 210 to external end devices. Logical tunnel end point 210 can be associated with a virtual IP address. For example, if end device 204 establishes a tunnel with fabric switch 100 via network 200, fabric switch 100 represents itself as logical tunnel end point 210. If end device 204 sends a packet via the tunnel, end device 204 encapsulates the packet in a tunnel encapsulation header with the virtual IP address as the egress address One or more member switches of fabric switch 100 can participate in logical tunnel end point 210. The virtual IP address can be assigned to the member switches participating in logical tunnel end point 210. If any of these member switches receive the packet, that member switch considers the packet to be destined to the local switch and decapsulates the encapsulation header. In this way, fabric switch 100 can operate as a single logical tunnel end point for the tunnels established via network 200.

The virtual IP address associated with logical tunnel end point 210 also allows fabric switch 100 to operate as a single layer-3 gateway (e.g., a gateway router). For example, end device 114 can use the virtual IP address as the gateway IP address for all its communication. As a result, when end device 114 initiates any communication, end device 114 can issue an Address Resolution Protocol (ARP) query. When the query reaches a switch participating in logical tunnel end point 210, the switch responds with an ARP reply comprising a virtual MAC address mapped to the virtual IP address. A switch participating in logical tunnel end point 210 can maintain such mapping in a local storage device.

Upon receiving the reply, end device 114 uses the virtual MAC address as the destination MAC address for its subsequent communication. In some embodiments, one of the switches participating in logical tunnel end point 210 can be elected to respond to a ARP query for the virtual IP address. All other switches forward ARP query to the elected switch. If the elected with fails, another switch can be elected. In some embodiments, the switch with the highest (or lowest) switch identifier value is elected for responding to ARP queries for the virtual IP address.

If fabric switch 100 has a full mesh of tunnels for a respective member switch, fabric switch 100 does not need to maintain a separate routing protocol for forwarding via the tunnels. For example, since switch 103 has tunnel 218 with switch 105, a packet encapsulated in a tunnel header with the switch identifiers of switches 103 and 105 as source and destination addresses, respectively, can be forwarded based on routing information of fabric switch 100. Switch 104 can receive such a packet, checks its local forwarding information, and forward the packet to switch 105. As a result, packet forwarding between any two member switches can entirely based on tunnel encapsulation. An intermediate switch, such as switch 104, does not need to decapsulate the tunnel encapsulation header.

However, a full mesh of tunnels can lead to a large number of tunnels. For example, with five member switches of fabric switch 100, the number of tunnels is twenty five. Furthermore, for broadcast, unknown unicast, and multicast (BUM) traffic, a packet is replicated for a respective tunnel. In some embodiments, tunnels in fabric switch 100 follow the physical topology of fabric switch 100. For example, switch 103 does not establish tunnel 218 with switch 105 since switch 103 is not directly coupled with switch 105. As a result, a packet from switch 103 to switch 105 is forwarded via tunnel 216 to switch 104. Upon receiving the packet, switch 104 decapsulates the encapsulation header and examines the inner MAC address to determine switch 105 to be the egress switch for the packet. Switch 104 then re-encapsulates the packet in another tunnel header associated with tunnel 222 with the switch identifiers of switches 104 and 105 as the source and destination addresses, respectively.

This also allows fabric switch 100 to have a distribution tree of tunnels for the distribution of BUM traffic. For example, if switch 101 is the root switch of the tree, upon receiving a packet belonging to BUM traffic, switch 103 forwards the packet via tunnel 212 to switch 101. Switch 101 receives the packet, decapsulates the tunnel encapsulation header, and examines the inner MAC address to determine the packet to be in BUM traffic. Hence, switch 101 uses the distribution tree to forward the packet. Switch 101 re-encapsulates the packet in another tunnel header associated with the tree with the switch identifier of switch 101 as the source address, and a multicast address associated with the tree as the destination address.

If a switch is in a logical unit, all switches of that logical unit can operate as a virtual single tunnel end point in fabric switch 100. For example, logical unit 162 can have a single virtual IP address, which can be used as the tunnel end point for logical unit 162. Switches 103 and 104 can initiate or terminate forwarding of a packet encapsulated in a tunnel encapsulation using that virtual IP address. In some embodiments, the scope of such encapsulation and termination is limited within fabric switch 100 (e.g., the tunnel encapsulation header does not leave fabric switch 100). A respective switch of the logical unit can individually operate as a tunnel end point as well. For example, both switches 103 and 104 can have their respective tunnels even though they are in logical unit 162.

In some embodiments, a respective member switch periodically determines whether a tunnel is operational. For example, a switch can use Bi-directional Forwarding Detection (BFD) in the tunnels for detection of unavailability associated with a link, link aggregation, or switch. Upon detecting the unavailability, the switch generates a notification message, which indicates the type of unavailability, and sends the notification message to other member switches. Since such unavailability changes the adjacency of switches, the internal routing protocol of a respective member switch re-computes the paths in fabric switch 100.

Figure 2B:
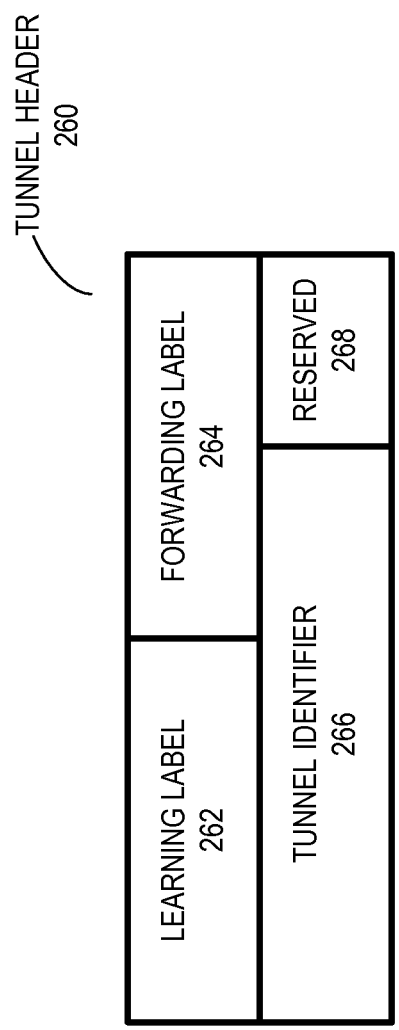
FIG. 2B illustrates an exemplary tunnel encapsulation header for an IP-based fabric switch, in accordance with an embodiment of the present invention.

FIG. 2B illustrates an exemplary tunnel encapsulation header for an IP-based fabric switch, in accordance with an embodiment of the present invention. A tunnel encapsulation header can include a tunnel header 260 in addition to outer IP and outer Ethernet headers. Tunnel header 260 can include a tunnel identifier 266, which identifies the corresponding tunnel. If the tunnel encapsulation in fabric switch 100 is based on VXLAN, tunnel header 260 can be an enhanced VXLAN header and tunnel identifier 266 can be a 24-bit long VXLAN Network Identifier (VNI).

In a VXLAN header, before the VNI, 32 bits are reserved for additional usage. In some embodiments, these 32 bits are used to represent a learning label 262 and a forwarding label 264, 16 bits each, in tunnel header 260. The 8 bits after the VNI can remain as reserved bits 268. These enhancements allows fabric switch 100 to support but virtual link aggregation groups, as described in conjunction with FIG. 5. Furthermore, the tunnels in fabric switch 100 can be agnostic to underlying topology.

Network Extensions

Figure 3A:
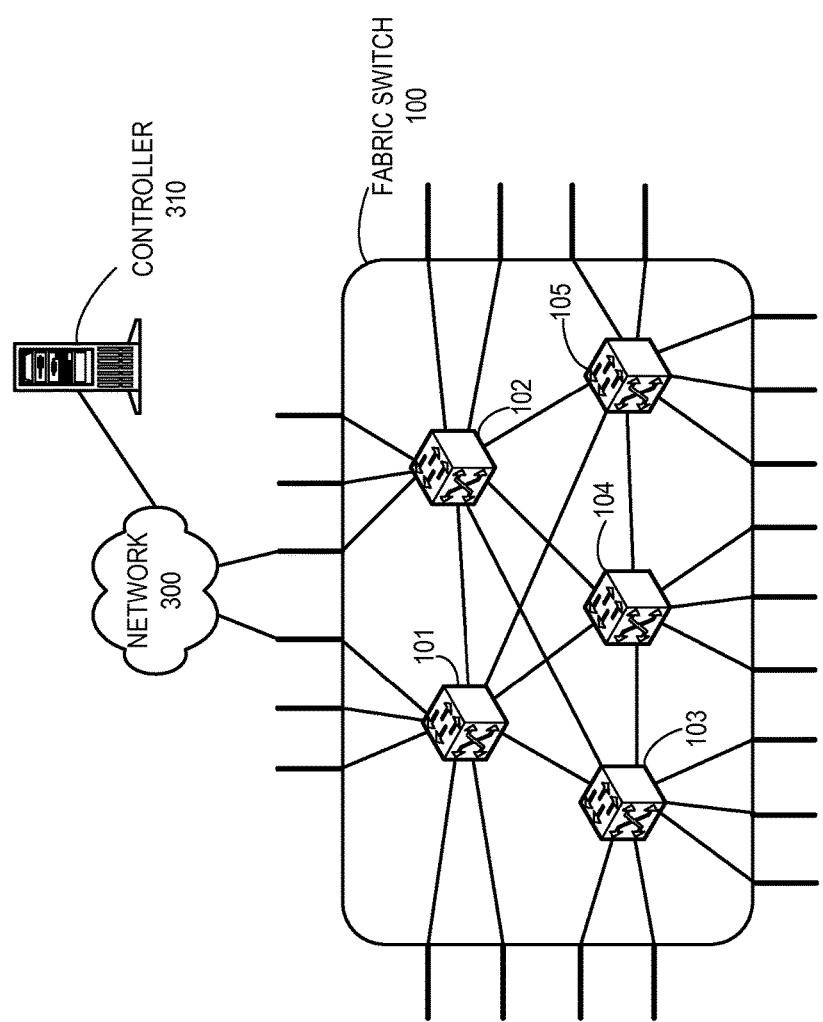
FIG. 3A illustrates an exemplary IP-based fabric switch participating in a software defined network, in accordance with an embodiment of the present invention.

In some embodiments, fabric switch 100 participates in a software-defined network (SDN). FIG. 3A illustrates an exemplary IP-based fabric switch participating in a software defined network, in accordance with an embodiment of the present invention. In this example, fabric switch 100 can be a heterogeneous software-defined network, which can include one or more switches capable of processing rules and configurations provided by a controller (such as those defined using OpenFlow). These one or more switches can be referred to as software-definable switches. A controller 310 is logically coupled to a respective software-definable switch in fabric switch 100 via a network 300 (e.g., a layer-2 or layer-3 network). Controller 310 can be physically coupled to a subset of the switches.

One or more services supported by fabric switch 100 can be configured from controller 310. Controller 310 can view fabric switch 100 as a logical chassis and provide configuration for the logical chassis. Upon receiving such configuration from controller 310, the receiving switch can distribute the configuration information to the member switches. For example, controller 310 can provide a set of port profiles for fabric switch 100. Upon receiving the port profiles from controller 310, the receiving member switch distributes the port profiles to other member switches. A port profile includes one or more MAC address of end devices, and specifies a set of configurations for a port (e.g., QoS, VLAN, and security configurations). If a switch detects a MAC address of a packet in a port profile, the switch applies the configurations of that port profile to the ingress port (and/or egress port) of the packet.

Similarly, fabric switch 100 can receive internal routing information (e.g., paths between member switches) from controller 310. This allows a member switch to establish a tunnel and forward traffic via the tunnel to another member switch without running a routing protocol within fabric switch 100. Controller 310 can also configure a global VLAN in fabric switch 100. A global VLAN is a virtualized network in fabric switch 100 and corresponds to a customer VLAN. A global VLAN identifier can be 24 bits long and its scope can be limited within fabric switch 100. Controller 310 can provide a mapping between the global VLAN and the customer VLAN.

Figure 3B:
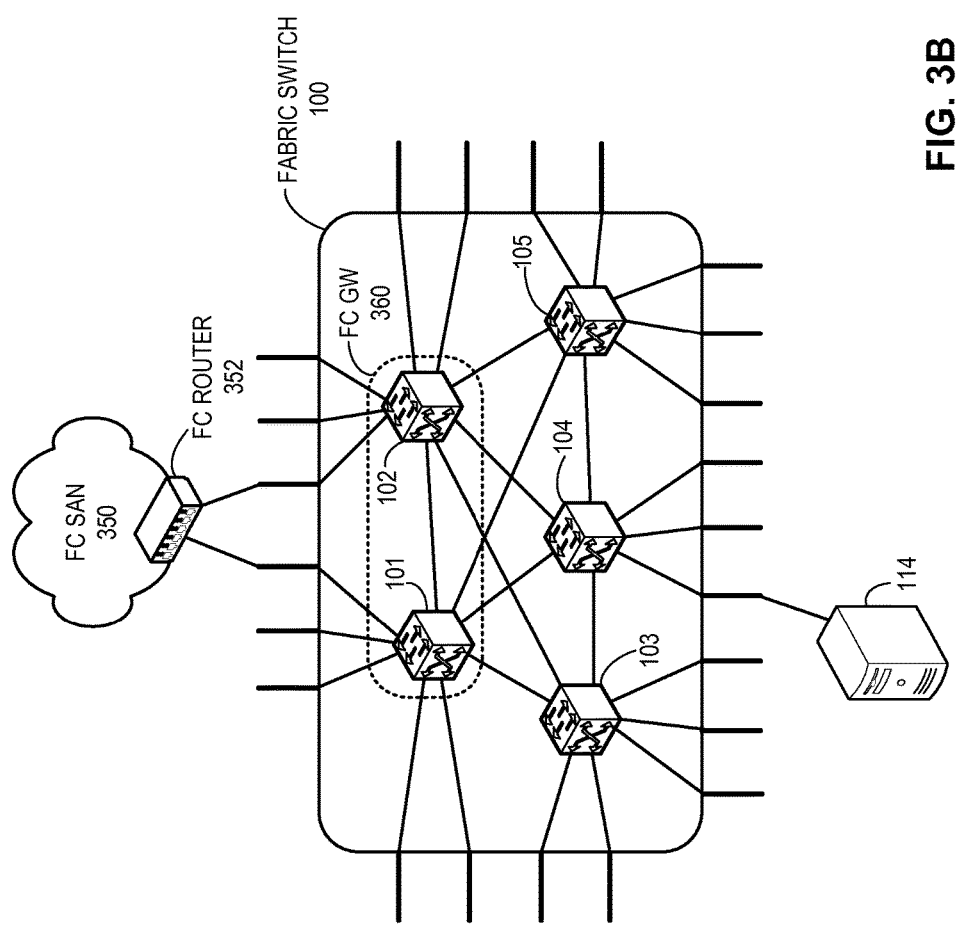
FIG. 3B illustrates exemplary Fibre Channel (FC) gateways in an IP-based fabric switch, in accordance with an embodiment of the present invention.

FIG. 3B illustrates exemplary Fibre Channel (FC) gateways in an IP-based fabric switch, in accordance with an embodiment of the present invention. In this example, switches 101 and 102 can form an FC gateway 360, and are coupled to FC storage area network (SAN) 350. In some embodiments, network 350 is an FC fabric and includes FC router 352. One or more target storage devices can be coupled to FC router 352. FC fabric 350 is dedicated to provide access to data blocks from the targets.

Switch 101 and 102 can present FC router 352 as virtual switch 352 to switches 103, 104, and 105. In some embodiments, mapped identifiers in fabric switch 100 are in the same format as the domain identifier of FC routers 352. Switches 101 and 102 advertise the domain identifier of FC router 352 as the mapped (or switch) identifier of virtual switch 352. In this way, switches 101 and 102 can forward FC over Ethernet (FCoE) traffic from an end device (e.g., end device 114) to an FC domain, thereby extending the domain of network 150 to the domain of fabric switch 100. As a result, a single routing protocol instance in a respective switch in fabric switch 100 can make routing decisions for tunnel-encapsulated Fibre Channel or non-Fibre Channel packets.

Fabric Formation

Figure 4:
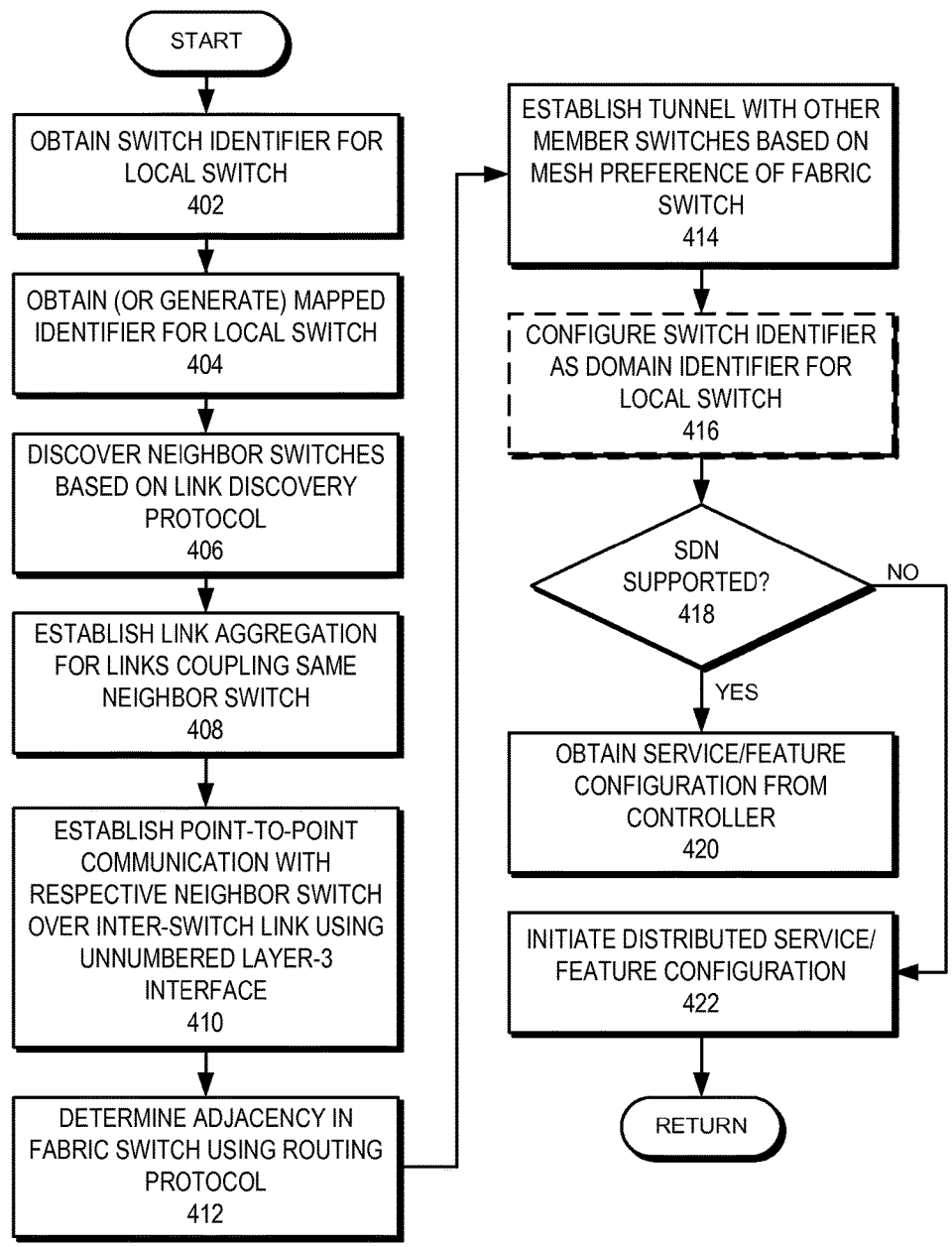
FIG. 4 presents a flowchart illustrating the fabric-formation process of a member switch in an IP-based fabric switch, in accordance with an embodiment of the present invention.

FIG. 4 presents a flowchart illustrating the fabric-formation process of a member switch in an IP-based fabric switch, in accordance with an embodiment of the present invention. During operation, the switch obtains a switch identifier (e.g., an IP address) for the local switch (operation 402). The switch can obtain this switch identifier from a user or an identifier allocation service (e.g., DHCP). The switch then obtains a mapped identifier for the local switch (operation 404). The switch can also generate the mapped identifier based on the switch identifier or based on an indexing service. The switch then discovers the neighbor switches based on a link discovery protocol (e.g., LLDP) (operation 406).

The switch establishes link aggregation for the links coupling the same neighbor switch (operation 408). In the example in FIG. 1A, switch 101 forms a link aggregation 130 for the links coupling switch 103. The switch establishes point-to-point communication with a respective neighbor switch over inter-switch link using unnumbered layer-3 interface (operation 410). The switch determines adjacency (e.g., paths) within the fabric switch using a routing protocol (e.g., a variation of OSPF) (operation 412). The switch then establishes tunnels with other member switches based on mesh preference of the fabric switch (operation 414). For example, if the mesh preference indicates a full mesh, the switch establishes a tunnel with a respective other member switch. On the other hand, if the mesh preference indicates a partial mesh, the switch establishes a tunnel with a subset of other member switches (e.g., directly coupled member switches).

In some embodiments, the switch configures the switch identifier (e.g., the IP address) as the domain identifier for the local switch (operation 416). This facilitates additional compatibility for the switch to operate in both IP-based and domain identifier based fabric switch. The switch then checks whether the switch supports operating in a software defined network (operation 418). If so, the switch obtains service/feature configuration from a controller of the software defined network (operation 420), as described in conjunction with FIG. 3A. Otherwise, the switch initiates distributed service/feature configuration (operation 422). For example, the switch can initiate sharing of configuration information of a respective member switch, as described in conjunction with FIG. 1C.

Virtual Link Aggregation

Figure 5:
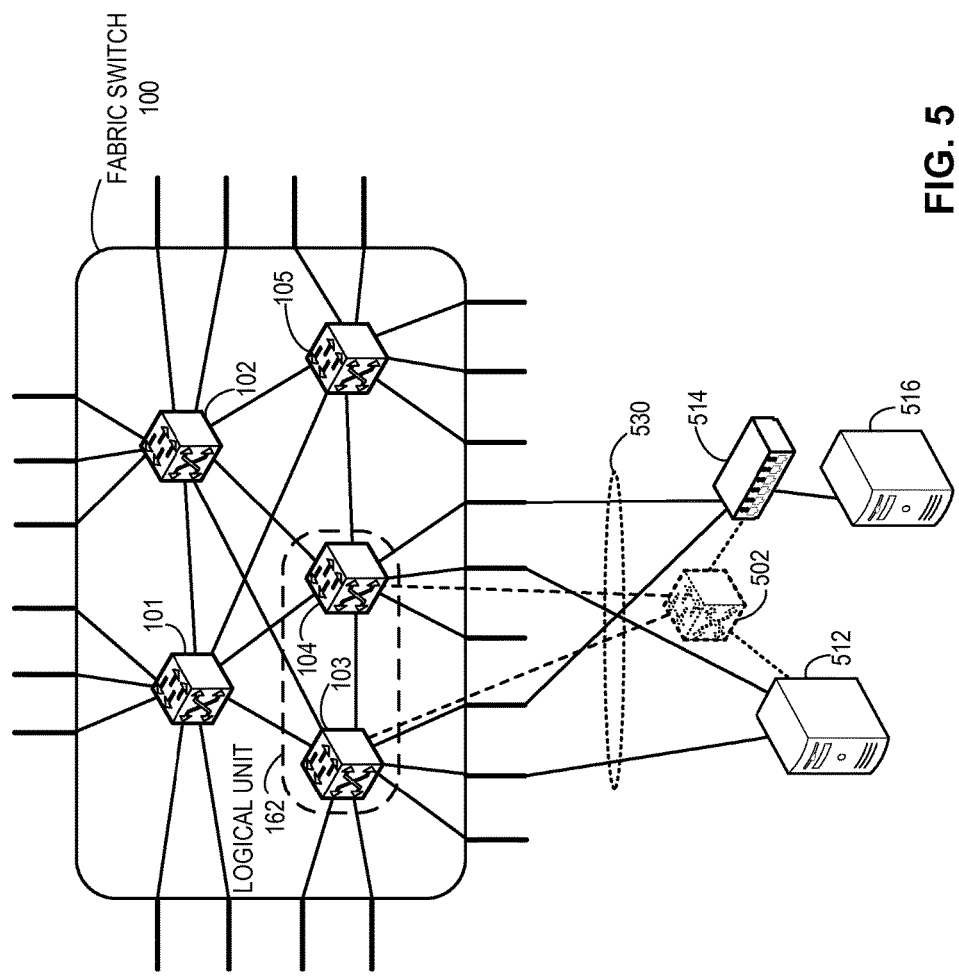
FIG. 5 illustrates an exemplary virtual link aggregation group in an IP-based fabric switch, in accordance with an embodiment of the present invention.

FIG. 5 illustrates an exemplary virtual link aggregation group in an IP-based fabric switch, in accordance with an embodiment of the present invention. As illustrated in FIG. 5, end device 512 and 516 are both dual-homed and coupled to switches 103 and 104. The goal is to allow a dual-homed end device to use physical links to at least two separate switches as a single, logical aggregate link, with the same media access control (MAC) address. Such a configuration would achieve true redundancy and facilitate fast protection switching. A link aggregation group coupling a device to at least two other devices can be referred to as a virtual link aggregation group.

Switches 103 and 104 are configured to operate in a special "trunked" mode for end devices 512 and 514, thereby forming a virtual link aggregation group 530. End devices 514 and 514 view switches 103 and 104 as a common virtual switch 502, with a corresponding virtual switch identifier. Dual-homed end devices 512 and 514 are considered to be logically coupled to virtual switch 502 via logical links (denoted by dotted lines). Virtual switch 502 is considered to be logically coupled to both switches 103 and 104, optionally with zero-cost links (represented by dashed lines). Other switches may view end devices 512 and 514 to be coupled with virtual switch 502.

Among the links in a link trunk, one link is selected to be a primary link. For example, the primary link for end device 512 can be the link to switch 103. Switches participating in a virtual link aggregation group and forming a virtual switch are referred to as "partner switches." Operation of virtual switches for multi-homed end devices is specified in U.S. patent application Ser. No. 12/725,249, entitled "Redundant Host Connection in a Routed Network," the disclosure of which is incorporated herein in its entirety.

In a typical layer-3 redundancy protocol (e.g., Virtual Router Redundancy Protocol (VRRP)), a dual-homed end device should support layer-3 communication. On the other hand, an end device coupling a virtual link aggregation group can be in layer-2. In the example in FIG. 5, end device 514 can be a layer-2 networking device (e.g., an Ethernet switch) coupling another end device 516. Since switches 103 and 104 can be in logical unit 162, virtual link aggregation group 530 can facilitate high availability within logical unit 162 for end devices 512 and 514. Furthermore, switches 103 and 104 can initiate and terminate tunnel encapsulation based on the virtual switch identifier of virtual switch 502. Upon receiving a packet from end device 512, switch 103 (or switch 104) encapsulates the packet in a tunnel encapsulation header and includes an identifier for virtual link aggregation group 530 in the tunnel encapsulation header, as described in conjunction with FIG. 2B. Furthermore, switch 103 can assign the virtual switch identifier of virtual switch 502 as the source address in the tunnel encapsulation header.

Exemplary Switch

Figure 6:
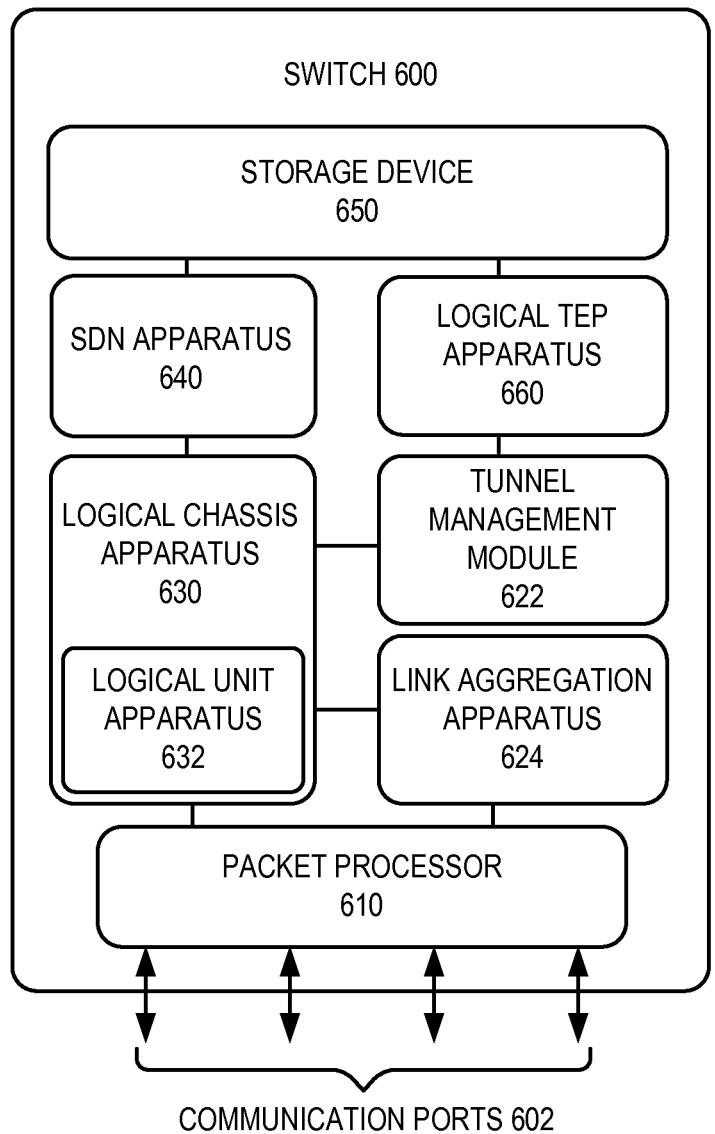
FIG. 6 illustrates an exemplary member switch in an IP-based fabric switch, in accordance with an embodiment of the present invention.

FIG. 6 illustrates an exemplary member switch in an IP-based fabric switch, in accordance with an embodiment of the present invention. In this example, a switch 600 includes a number of communication ports 602, a packet processor 610, a logical chassis apparatus 630, and a storage device 650. In some embodiments, packet processor 610 adds an encapsulation header to a packet.

In some embodiments, logical chassis apparatus 630 maintains a membership in a fabric switch, which can represent itself as a logical chassis. Logical chassis apparatus 630 maintains a configuration database in storage device 650 that maintains the configuration state of a respective switch within the logical chassis, as described in conjunction with FIG. 1C. Logical chassis apparatus 630 maintains the state of the fabric switch and the logical chassis, which is used to join other switches. Under such a scenario, communication ports 602 can include inter-switch communication channels for communication within the fabric switch. This inter-switch communication channel can be implemented via a regular communication port and based on any open or proprietary format (e.g., IP protocol).

Logical chassis apparatus 630 facilitates formation of the fabric switch represented as the logical chassis, as described in conjunction with FIG. 4. Logical chassis apparatus 630 also allows switch 600 to participate in the name service of the fabric switch. If switch 600 is in a logical unit, logical unit apparatus 632 maintains the logical unit for switch 600, as described in conjunction with FIG. 1D. Tunnel management apparatus 622 maintains tunnels with other member switches, as described in conjunction with FIG. 2A. In some embodiments, switch 600 includes a tunnel end point apparatus 666, which operates the logical chassis as an end point for an external tunnel (i.e., the tunnel's other end point is outside of the logical chassis). If switch 600 supports software defined network, SDN apparatus 640 facilitates configuration of switch 600 based on rules and configurations from a controller, as described in conjunction with FIG. 3A. Link aggregation apparatus 624 supports virtual link aggregation groups in switch 600.

Note that the above-mentioned modules and apparatuses can be implemented in hardware as well as in software. In one embodiment, these modules and apparatuses can be embodied in computer-executable instructions stored in a memory which is coupled to one or more processors in switch 600. When executed, these instructions cause the processor(s) to perform the aforementioned functions.

In summary, embodiments of the present invention provide a switch and a method for facilitating an IP-based logical chassis. In one embodiment, the switch includes a logical chassis apparatus and a tunnel apparatus. The logical chassis apparatus associates a logical chassis identifier of a logical chassis with the switch and assigns an Internet Protocol (IP) address as switch identifier of the switch. The logical chassis includes a plurality of member switches and the switch is a member switch of the logical chassis. The IP address uniquely identifies the switch in the logical chassis. The tunnel apparatus establishes a tunnel with a remote switch in the logical chassis. An inter-switch packet from the switch is encapsulated in a tunnel header associated with the tunnel.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   chassis management circuitry configured to assign a virtual Internet Protocol (IP) address to the switch, wherein the virtual IP address is associated with a logical unit comprising the switch and a second switch in a network of interconnected switches, wherein the network of interconnected switches further includes a third switch and is identified by a fabric identifier distinct from the virtual IP address, and wherein the fabric identifier is assigned to a respective switch of the network of interconnected switches; and
   tunnel circuitry configured to:
      encapsulate a packet with a tunnel header associated with a tunnel between the logical unit and the third switch, wherein the tunnel header includes the virtual IP address as a source address and a second IP address of the third switch as a destination address; and
      determine a port from the one or more ports as an egress port for the encapsulated packet based on the second IP address.

2. The switch of claim 1, wherein the chassis management circuitry is further configured to maintain a mapped identifier assigned to the switch, wherein the mapped identifier is an index for the switch in the network of interconnected switches based on a monotonically incrementing integer.

3. The switch of claim 2, wherein a port of the switch is identified by a port identifier uniquely identifying the port in the network of interconnected switches, and wherein the port identifier includes the mapped identifier.

4. The switch of claim 1, wherein the chassis management circuitry is further configured to determine a route between the switch and the third switch in the network of interconnected switches by running a routing protocol, and wherein the port is determined based on the route.

5. The switch of claim 1, wherein the chassis management circuitry is further configured to manage the network of interconnected switches from a single point based on one or more of:
   a command line interface (CLI);
   a Network Configuration Protocol (NETCONF); and
   RESTCONF.

6. The switch of claim 1, wherein the logical unit is a building unit of the network of interconnected switches, and wherein the second IP address in the encapsulation header is a second virtual IP address associated with a second logical unit that includes the third switch.

7. The switch of claim 6, wherein the second logical unit further includes a fourth switch of the network of interconnected switches, and wherein the third switch and the fourth switch share the second virtual IP address for operating as tunnel end points for the tunnel.

8. The switch of claim 1, further comprising tunnel end point circuitry configured to operate the network of interconnected switches as a first end point for an external second tunnel, wherein a second end point of the external second tunnel is outside of the network of interconnected switches.

9. The switch of claim 1, further comprising link aggregation circuitry configured to:
   identify a plurality of links that correspond to a same neighbor switch of the switch; and
   operate the identified links as a link aggregation group, wherein the link aggregation group operate as a single logical link.

10. The switch of claim 1, wherein the switch is in a software defined network, and
   wherein the chassis management circuitry is further configured to obtain configuration information from an instruction message from a controller of the software defined network.

11. The switch of claim 1, wherein the chassis management circuitry is further configured to establish, as an inter-switch link, a point-to-point connection with the third switch using an unnumbered interface.

12. The switch of claim 1, wherein the chassis management circuitry is further configured to discover a neighbor switch of the switch based on a link discovery protocol.

13. The switch of claim 1, wherein the tunnel circuitry is further configured to encapsulate the packet with a second tunnel header associated with a third tunnel between the switch and a fourth switch, wherein the packet is a multi-destination packet.

* * * * *